US010408929B2

(12) United States Patent
R. et al.

(10) Patent No.: US 10,408,929 B2
(45) Date of Patent: Sep. 10, 2019

(54) NON-SYNCHRONIZED RF RANGING

(71) Applicant: Intel Corporation, Santa Clara, CA (US)

(72) Inventors: Raghavendra R., Bangalore (IN); Raghavendra Bhat, Bangalore (IN); Viswanath Dibbur, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/870,530

(22) Filed: Jan. 12, 2018

(65) Prior Publication Data

US 2019/0041508 A1 Feb. 7, 2019

(51) Int. Cl.

| G01S 11/08 | (2006.01) |
|---|---|
| G01S 5/02 | (2010.01) |
| G06K 19/07 | (2006.01) |
| G01S 5/14 | (2006.01) |

(52) U.S. Cl.
CPC .............. *G01S 11/08* (2013.01); *G01S 5/021* (2013.01); *G01S 5/0289* (2013.01); *G01S 5/14* (2013.01); *G06K 19/0701* (2013.01)

(58) Field of Classification Search
CPC . G01S 13/84; G01S 5/14; G01S 5/021; G01S 11/08; G01S 5/0289; H04W 4/80; H04W 84/12; H04B 2001/6912; H04M 2250/04; G06K 19/0701
See application file for complete search history.

(56) References Cited

U.S. PATENT DOCUMENTS

| 4,011,562 | A  | * | 3/1977 | Bruce ....................... G01S 5/14 342/125 |
|---|---|---|---|---|
| 9,906,273 | B2 | * | 2/2018 | Fang ..................... H04B 5/0031 |
| 10,001,555 | B2 | * | 6/2018 | Seller ....................... G01S 13/84 |
| 2005/0020279 | A1 | * | 1/2005 | Markhovsky ......... G01S 5/0294 455/456.1 |
| 2013/0147655 | A1 | * | 6/2013 | Kishigami ............ G01S 13/284 342/135 |
| 2017/0026798 | A1 | * | 1/2017 | Prevatt .................. H04W 4/023 |

OTHER PUBLICATIONS

Abusubaih, Murah, et al.: "A Dual Distance Measurement Scheme for Indoor IEEE 802.11 Wireless Local Area Networks", In Proc. of the 9th IFIP/IEEE International Conference on Mobile and Wireless Communication Networks (MWCN'07), Cork, Ireland, Sep. 2007, 5 pages.

\* cited by examiner

*Primary Examiner* — Rahel Guarino
(74) *Attorney, Agent, or Firm* — Grossman, Tucker, Perreault & Pfleger, PLLC

(57) ABSTRACT

Various systems and methods for determining a distance between a master device and a slave device based, at least in part, on a received signal strength and based, at least in part, on a time interval including generation of a master ranging symbol and detection of a slave ranging symbol.

21 Claims, 9 Drawing Sheets

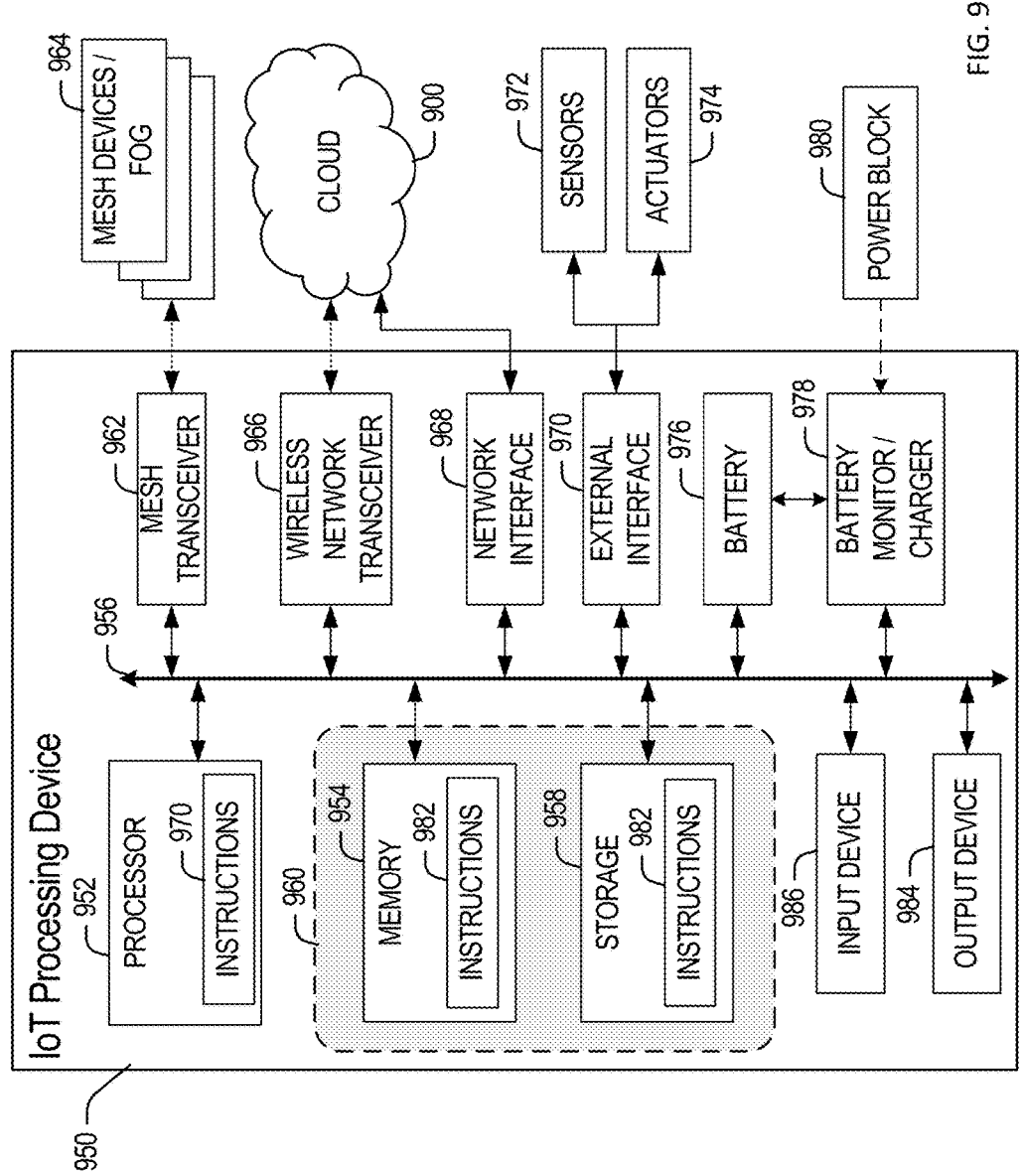

NON-SYNCHRONIZED RF RANGING

TECHNICAL FIELD

Embodiments described herein generally relate to processing techniques used with data communications and interconnected device networks, and in particular, to techniques applied within internet of things (IoT) devices and device networks.

BACKGROUND

IoT devices are physical objects that may communicate on a network, and may include sensors, actuators, and other input/output components, such as to collect data or perform actions from a real world environment. For example, IoT devices may include low-powered devices that are embedded or attached to everyday things, such as buildings, vehicles, packages, etc., to provide an additional level of artificial sensory perception of those things. Recently, IoT devices have become more popular and thus applications using these devices have proliferated.

Various standards have been proposed to more effectively interconnect and operate IoT devices and IoT network use cases. These include the specialization of communication standards distributed by groups such as Institute of Electrical and Electronics Engineers (IEEE), and the specialization of application interaction architecture and configuration standards distributed by groups such as the Open Connectivity Foundation (OCF).

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIG. 9 illustrates a block diagram for an example IoT processing system architecture upon which any one or more of the techniques (e.g., operations, processes, methods, and methodologies) discussed herein may be performed, according to an example.

DETAILED DESCRIPTION

In the following description, methods, configurations, and related apparatuses are disclosed for determining a location of a device in an IoT device interconnection setting through the use of analog signaling, received signal strength and time-of-flight.

The techniques discussed herein include utilizing analog signaling, received signal strength and time of flight to determine a distance between two devices without synchronization between the transmitting device and the receiving device. The techniques are configured to be interoperable between heterogeneous nodes meaning one node may be configured to communicate using a first communication protocol (e.g., Bluetooth) and a second node may be configured to communicate using a second communication protocol (e.g., ZigBee). The techniques are further configured to be relatively efficient by eliminating the use of time synchronization in the distance determinations. In wireless sensor networks, it may be advantageous to know a location of each node, e.g., sensor node, in the network. Autodiscovery of the respective location of each node, using for example, a technique as described herein, may reduce a time and corresponding cost of deployment.

Figure 1:
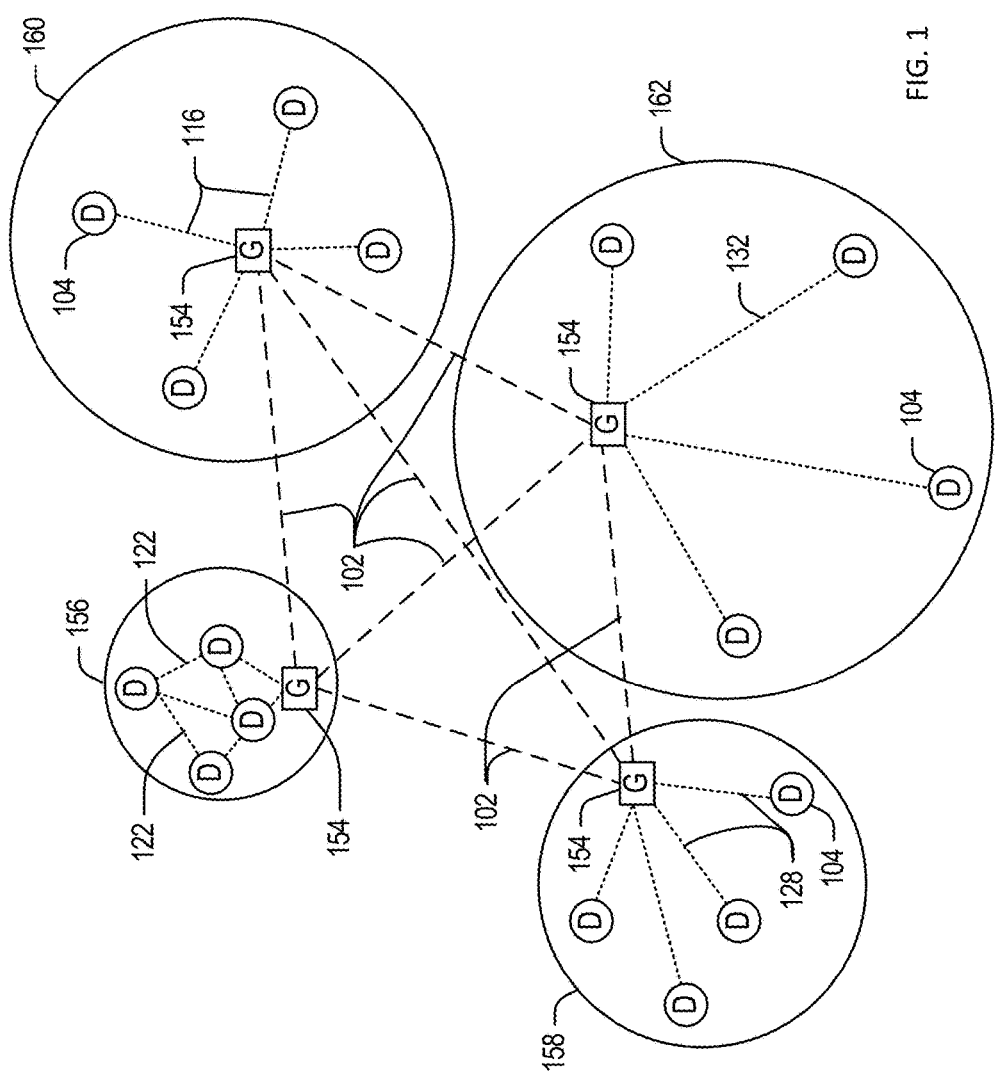
FIG. 1 illustrates an domain topology for respective internet-of-things (IoT) networks coupled through links to respective gateways, according to an example.

FIG. 1 illustrates an example domain topology for respective internet-of-things (IoT) networks coupled through links to respective gateways. The internet of things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

Figure 2:
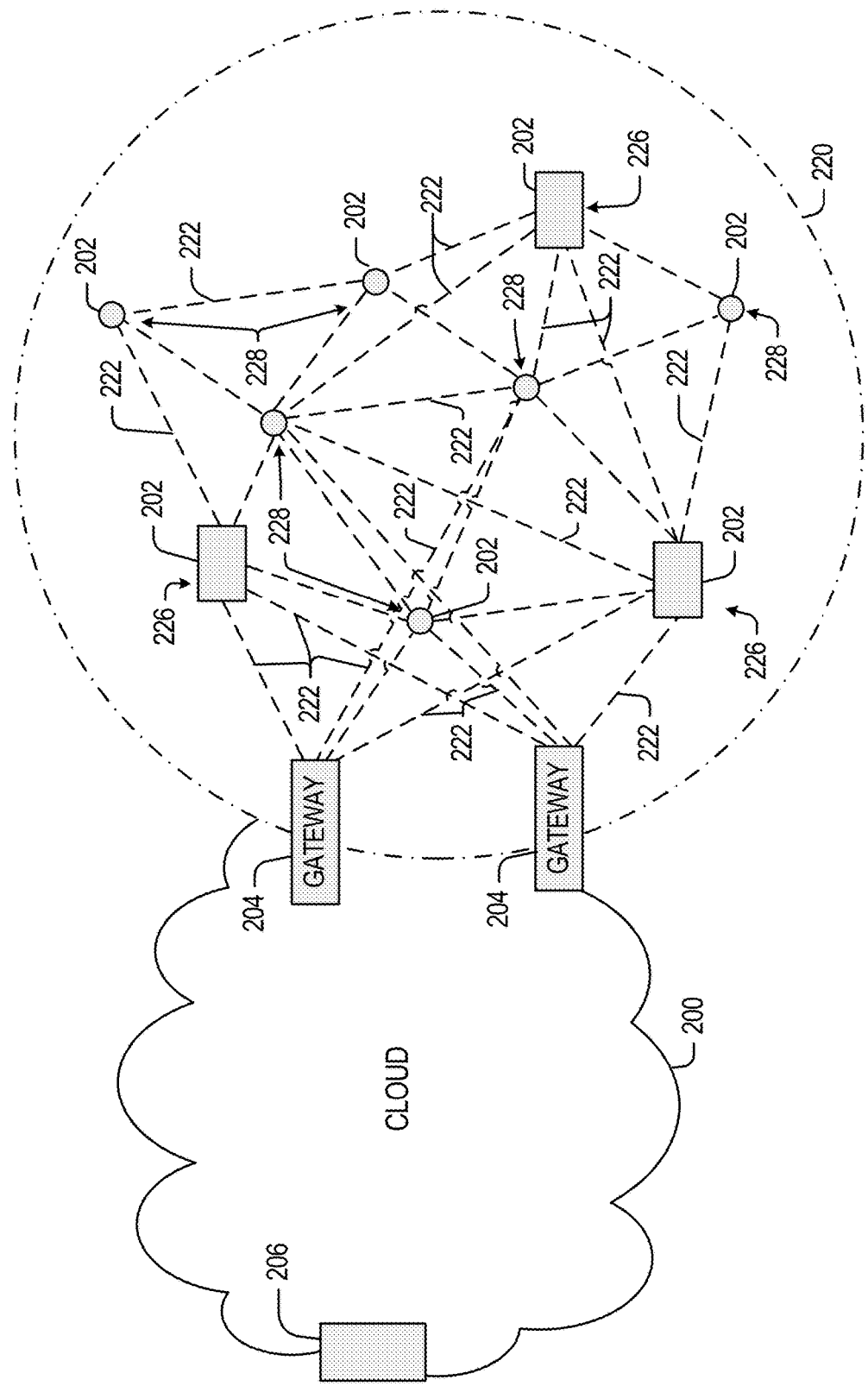
FIG. 2 illustrates a cloud computing network in communication with a mesh network of IoT devices operating as a fog device at the edge of the cloud computing network, according to an example.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS)

terms specified in service level and service delivery agreements. As will be understood, the use of IoT devices and networks, such as those introduced in FIGS. 1 and 2, present a number of new challenges in a heterogeneous network of connectivity comprising a combination of wired and wireless technologies.

FIG. 1 specifically provides a simplified drawing of a domain topology that may be used for a number of internet-of-things (IoT) networks comprising IoT devices 104, with the IoT networks 156, 158, 160, 162, coupled through backbone links 102 to respective gateways 154. For example, a number of IoT devices 104 may communicate with a gateway 154, and with each other through the gateway 154. To simplify the drawing, not every IoT device 104, or communications link (e.g., link 116, 122, 128, or 132) is labeled. The backbone links 102 may include any number of wired or wireless technologies, including optical networks, and may be part of a local area network (LAN), a wide area network (WAN), or the Internet. Additionally, such communication links facilitate optical signal paths among both IoT devices 104 and gateways 154, including the use of MUXing/deMUXing components that facilitate interconnection of the various devices.

The network topology may include any number of types of IoT networks, such as a mesh network provided with the network 156 using Bluetooth low energy (BLE) links 122. Other types of IoT networks that may be present include a wireless local area network (WLAN) network 158 used to communicate with IoT devices 104 through IEEE 802.11 (Wi-Fi®) links 128, a cellular network 160 used to communicate with IoT devices 104 through an LTE/LTE-A (4G) or 5G cellular network, and a low-power wide area (LPWA) network 162, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into as fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 104, such as over the backbone links 102, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

The mesh network 156, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 158, for instance, may use systems that perform standards conversion to provide multi-standard connectivity, enabling IoT devices 104 using different protocols to communicate. Further systems may provide seamless interconnectivity across a multi-standard infrastructure comprising visible Internet resources and hidden Internet resources.

Communications in the cellular network 160, for instance, may be enhanced by systems that offload data, extend communications to more remote devices, or both. The LPWA network 162 may include systems that perform non-Internet protocol (IP) to IP interconnections, addressing, and routing. Further, each of the IoT devices 104 may include the appropriate transceiver for wide area communications with that device. Further, each IoT device 104 may include other transceivers for communications using additional protocols and frequencies. This is discussed further with respect to the communication environment and hardware of an IoT processing device depicted in FIGS. 8 and 9.

Finally, clusters of IoT devices may be equipped to communicate with other IoT devices as well as with a cloud network. This may allow the IoT devices to form an ad-hoc network between the devices, allowing them to function as a single device, which may be termed a fog device. This configuration is discussed further with respect to FIG. 2 below.

FIG. 2 illustrates a cloud computing network in communication with a mesh network of IoT devices (devices 202) operating as a fog device at the edge of the cloud computing network. The mesh network of IoT devices may be termed a fog 220, operating at the edge of the cloud 200. To simplify the diagram, not every IoT device 202 is labeled.

The fog 220 may be considered to be a massively interconnected network wherein a number of IoT devices 202 are in communications with each other, for example, by radio links 222. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices 202 are shown in this example, gateways 204, data aggregators 226, and sensors 228, although any combinations of IoT devices 202 and functionality may be used. The gateways 204 may be edge devices that provide communications between the cloud 200 and the fog 220, and may also provide the backend process function for data obtained from sensors 228, such as motion data, flow data, temperature data, and the like. The data aggregators 226 may collect data from any number of the sensors 228, and perform the back end processing function for the analysis. The results, raw data, or both may be passed along to the cloud 200 through the gateways 204. The sensors 228 may be full IoT devices 202, for example, capable of both collecting data and processing the data. In some cases, the sensors 228 may be more limited in functionality, for example, collecting the data and allowing the data aggregators 226 or gateways 204 to process the data.

Communications from any IoT device 202 may be passed along a convenient path (e.g., a most convenient path) between any of the IoT devices 202 to reach the gateways 204. In these networks, the number of interconnections provide substantial redundancy, allowing communications to be maintained, even with the loss of a number of IoT devices 202. Further, the use of a mesh network may allow IoT devices 202 that are very low power or located at a distance from infrastructure to be used, as the range to connect to another IoT device 202 may be much less than the range to connect to the gateways 204.

The fog 220 provided from these IoT devices 202 may be presented to devices in the cloud 200, such as a server 206, as a single device located at the edge of the cloud 200, e.g., a fog device. In this example, the alerts coming from the fog device may be sent without being identified as coming from a specific IoT device 202 within the fog 220. In this fashion, the fog 220 may be considered a distributed platform that provides computing and storage resources to perform processing or data-intensive tasks such as data analytics, data aggregation, and machine-learning, among others.

In some examples, the IoT devices 202 may be configured using an imperative programming style, e.g., with each IoT device 202 having a specific function and communication partners. However, the IoT devices 202 forming the fog device may be configured in a declarative programming style, allowing the IoT devices 202 to reconfigure their operations and communications, such as to determine needed resources in response to conditions, queries, and device failures. As an example, a query from a user located at a server 206 about the operations of a subset of equipment monitored by the IoT devices 202 may result in the fog 220 device selecting the IoT devices 202, such as particular sensors 228, needed to answer the query. The data from these sensors 228 may then be aggregated and analyzed by any combination of the sensors 228, data aggregators 226, or gateways 204, before being sent on by the fog 220 device to the server 206 to answer the query. In this example, IoT devices 202 in the fog 220 may select the sensors 228 used based on the query, such as adding data from flow sensors or temperature sensors. Further, if some of the IoT devices 202 are not operational, other IoT devices 202 in the fog 220 device may provide analogous data, if available.

Figure 3:
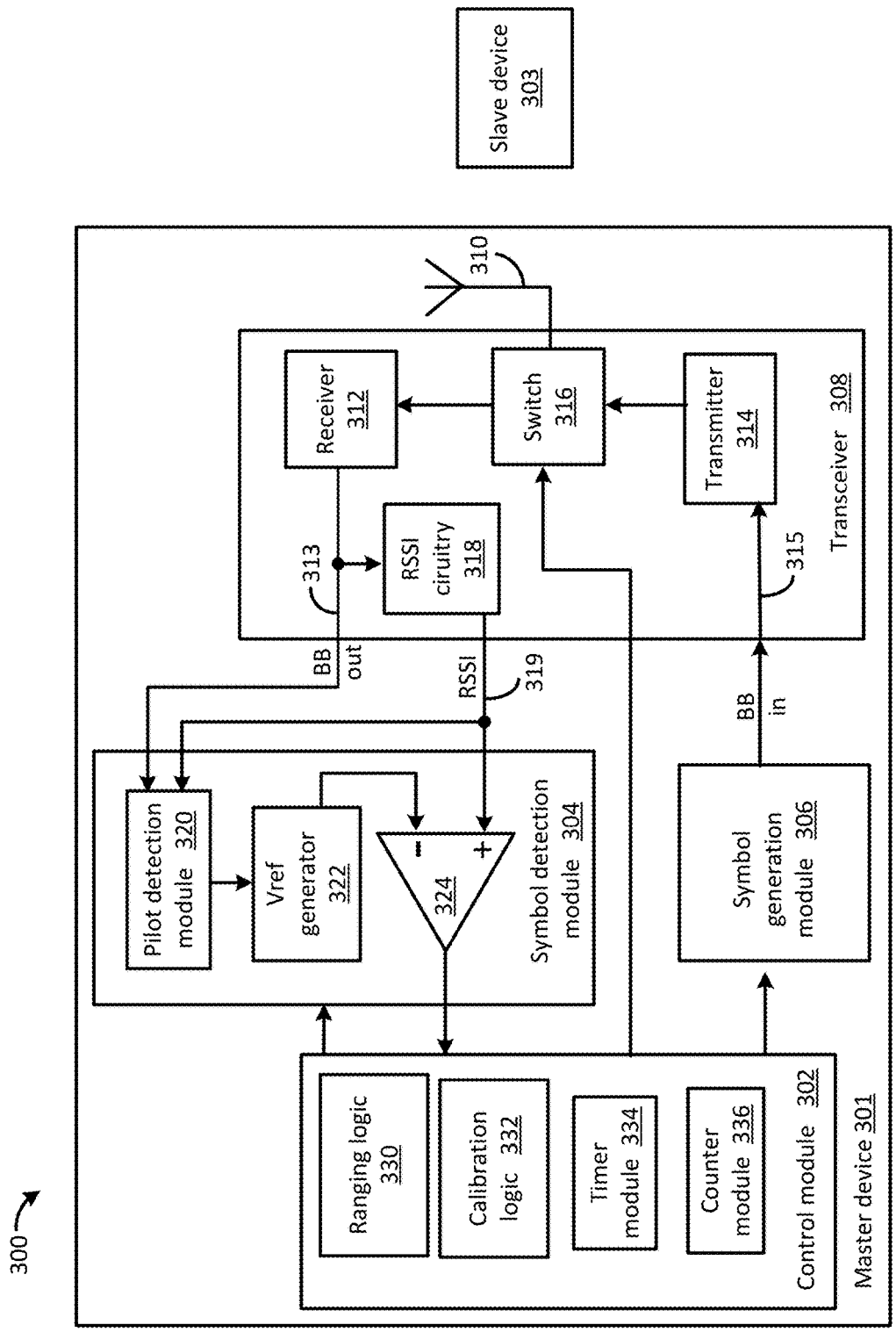
FIG. 3 illustrates a functional block diagram of system including a master device and a slave device, according to an example.

FIG. 3 illustrates a functional block diagram of system 300 including a master device 301 and a slave device 303, according to an example. The master device 301 is configured to initiate a special mode from a normal mode and to manage ranging operations in the special mode, as described herein. The normal mode corresponds to communication according to one or more communication protocols, as described herein. The special mode corresponds to operations associated with ranging operations configured to determine location, e.g., a distance between the master device and the slave device, as described herein. The slave device 303 is configured to switch to the special mode in response to a change mode signal from the master device 301 and to acknowledge mode change to the master device 301. Ranging operations may then be performed by the master device 301 and the slave device 303 in the special mode. In an embodiment, the change mode signal and corresponding acknowledgment may be communicated between the master device 301 and slave device 303, directly, using a same communication protocol. In another embodiment, the change mode signal and corresponding acknowledgment may be communicated between the master device 301 and slave device 303 via a gateway, as described herein, when the master device 301 and the slave device 303 are configured to communicate using different protocols.

Generally, during ranging operations, the master device 301 is configured to monitor ambient receive signal strength and to initiate ranging operations if the ambient receive signal strength drops below a threshold. The master device 301 is then configured to transmit a first estimation symbol. The slave device 303 may then detect a received first estimation symbol corresponding to the transmitted first estimation symbol. The slave device 303 may then transmit a second estimation symbol. The master device 301 may then detect a received second estimation symbol corresponding to the transmitted second estimation symbol. The master device 301 and the slave device 303 may each utilize the respective detected received estimation symbols to determine a reference voltage, as will be described in more detail below.

Following estimation operations, the master device 301 may then generate and transmit a first ranging symbol. The slave device 303 may then detect a received first ranging symbol corresponding to the transmitted first ranging symbol. The slave device 303 may then generate and transmit a second ranging symbol. The master device 301 may then detect a received second ranging symbol corresponding to the transmitted second ranging symbol. The master device 301 is configured to determine a duration of a time interval ("ranging time interval") that includes, among other things, generation and transmission of the first ranging symbol and generation, transmission, reception and detection of the second ranging symbol. In one nonlimiting example the duration of the ranging time interval may be on the order of 10 µs (microseconds). The ranging time interval may then be utilized to determine a distance between the master device 301 and the slave device 303. For example, a plurality of ranging time intervals may be determined during a measurement interval and a ranging cycle time may then be determined based, at least in part, on a distribution of the plurality of ranging time intervals, as described herein. In one nonlimiting example a duration of the measurement interval may be on the order of 200 to 300 ms (milliseconds).

Generally, the master device 301 is configured to perform the timing measurements, as described herein. Thus, the slave device 303 may generally not be configured to perform timing measurements. In this manner, complexities associated with clock synchronization between the master device 301 and the slave device 303 may be avoided.

The estimation symbols and ranging symbols may each correspond to a single frequency carrier signal, with a respective amplitude. In other words, the estimation symbols and ranging symbols each include an amplitude modulated carrier with each amplitude configured to be constant over at least a portion of the symbol. Such signals, i.e., analog signals without communication protocol specific modulation, allow use of the techniques described herein, independent of normal mode communication protocols of the master device 301 and the slave device 303. In other words, the estimation symbol and ranging symbol are communication protocol agnostic. Use of such analog symbols may reduce the hardware propagation delays by reducing components and/or operations that contribute to the hardware propagation delays.

The ranging time interval includes a first time-of-flight of the first ranging symbol from the master device 301 to the slave device 303, a second time-of-flight of the second ranging symbol from the slave device 303 to the master device 301, a slave hardware delay corresponding to a time interval from receipt of the first ranging symbol to transmission of the second ranging symbol and a master hardware delay that includes a time interval from generation of the first ranging symbol to transmission of the first ranging symbol and a time interval from receipt of the second ranging symbol to detection of the second ranging symbol. Assuming that the master device 301 and the slave device 303 are not moving relative to each other during ranging operations, the first time-of-flight and the second time-of-flight may generally be equal. A distance, D, between the master device 301 and the slave device 303 based, at least in part, on one ranging time interval, may then be determined as:

$$D = c/2 * ((t_{end} - t_{start}) - (t_{hw\_delay\_slave} + t_{hw\_delay\_master}))$$

where c is the velocity of propagation of the ranging symbol in air (e.g., approximately the speed of light, i.e., $3 \times 10^8$ meters/second), $t_{end}$ corresponds to a time at the end of the ranging time interval (i.e., when the second ranging symbol is detected), $t_{start}$ corresponds to the time at the start of the ranging time interval, thus, the difference, ($t_{end} - t_{start}$), corresponds to the ranging time interval. $t_{hw\_delay\_slave}$ is the time duration of the slave device hardware delay (i.e., slave hardware propagation delay) and $t_{hw\_delay\_master}$ is the time duration of the master device hardware delay (i.e., master hardware propagation delay). The hardware propagation delays correspond to propagation delay times of the ranging symbols in the devices 301, 303. The master hardware propagation delay includes the propagation delay time associated with generating the first ranging symbol to transmission from the master device antenna plus the propagation delay from arrival of the second ranging symbol at the master device antenna through detection of the second ranging symbol. The slave hardware propagation delay includes the propagation delay time from arrival of the first ranging symbol to the slave device antenna through detection of the first ranging symbol to generation of the second ranging symbol through transmission from the slave device antenna. The slave hardware propagation delay includes a switching delay in the transceiver, as described herein.

The hardware propagation delays are specific to the master device 301 and the slave device 303. In other words, the hardware propagation delays are not dependent on the distance between the master device 301 and the slave device 303. In one embodiment, the master propagation delay time and the slave propagation delay time may be determined at manufacturing. In this embodiment, the master device 301 and the slave device 303 may each include a preset hardware propagation delay time implemented through appropriate module. The preset hardware propagation delay times may then be used in the distance determinations, as described herein. In another embodiment, the respective hardware propagation delays may be determined via a calibration procedure, as will be described in more detail below.

In an embodiment, a plurality of ranging time intervals may be captured over a measurement interval. In one nonlimiting example, on the order of 1000 ranging time intervals may be captured. A ranging cycle time may then be determined based, at least in part, on a distribution of the plurality of ranging time intervals. For example, outliers may be discarded and the resulting ranging cycle time may then correspond to a relatively more likely ranging time interval duration. The distance, D, may then be determined with the ranging cycle time substituted for the ($t_{end} - t_{start}$) term in the above equation. Thus, the effects of random errors due to, for example, jitter, variation in delays, etc., may be accommodated.

Master device 301 and slave device 303 generally include the same or similar elements thus, in the following, to avoid repetition, the elements included in the master device 301 are described. A similar description applies to the elements (not shown) included in the slave device 303.

Master device 301 and slave device 303 each includes a control module 302, a symbol detection module 304, a symbol generation module 306, a transceiver 308 and an antenna 310. Control module 302 is configured to manage calibration operations, if any, ranging operations and transmit and receive operations. Symbol detection module 304 is configured to detect a received estimation symbol, to determine a reference voltage (Vref) based, at least in part, on a received pilot component of the received estimation symbol and to detect a received ranging symbol, as will be described in more detail below. Symbol generation module 306 is configured to generate an estimation symbol that includes a pilot component ("Pilot") and a synchronization component ("Sync") and/or a transmit ranging symbol that includes a corresponding synchronization ("Sync") component. Transceiver 308 is configured to transmit and receive one or more electromagnetic signals via the antenna 310 and to determine a received signal strength of a received signal.

Control module 302 includes ranging logic 330 and calibration logic 332. Control module 302 may further include a timer module 334 and/or a counter module 336. In one embodiment, timer module 334 in the master device 301 may be queried by a ranging logic 330 to determine a start time, $t_{start}$, and an end time, $t_{end}$, of a ranging time interval. In another embodiment, counter module 336 may be configured to count a number of sub-time intervals beginning at a start of a ranging time interval and stopping at an end of the ranging time interval. A duration of a sub-time interval may be known and predefined. In some embodiments, counter module 336 in the master device 301 may be configured to maintain a count of a number of ranging time intervals during ranging operations measurement mode, as described herein. In some embodiments, timer module 334 and/or counter module 336 may be used by master device 301 or slave device 303 for calibration operations, as described herein.

Transceiver 308 includes a receiver 312, a transmitter 314, a switch 316 and receiver signal strength indicator (RSSI) module 318. RSSI in this context is a general received signal strength that may correspond to a voltage. The switch 316 is coupled to the control module 302, the receiver 312, the transmitter 314 and the antenna 310. The switch 316 is configured to receive a control input from control module 302 and couple the transmitter 314 or the receiver 312 to the antenna 310 based, at least in part, on the control input. The transceiver 308 and transmitter 314 are configured to receive a baseband signal input (BB in) 315 from symbol generation module 306 for transmission via antenna 310. The transceiver 308 and receiver 312 are configured to receive a symbol via antenna 310 and provide a corresponding baseband signal output (BB out) 313 to symbol detection module 304. BB out 313 is a voltage corresponding to a received signal. RSSI module 318 is configured to capture BB out 313 and to determine a corresponding received signal strength (e.g., energy). Transceiver 308 and RSSI module 318 may then provide a voltage signal 319 corresponding to the RSSI to symbol detection module 304.

Calibration logic 332 is configured to manage calibration operations. Calibration operations are configured to determine the master device 301 and slave device 303 respective hardware propagation delays. Calibration operations may be performed by the master device 301 to determine the master hardware propagation delay, $t_{hw\_delay\_master}$, and by the slave device 303 to determine the slave hardware propagation delay, $t_{hw\_delay\_slave}$. For both the master device 301 and the slave device 303, calibration operations include a loopback between the transmitter and the receiver for a first number of cycles and a second number of cycles. The first number and the second number differ. In one nonlimiting example, the first number may be equal to 2 and the second number may be equal to 3.

Calibration logic 332 may be further configured to determine respective hardware delays based, at least in part, on selected time intervals associated with the first and second numbers of cycles. In one nonlimiting example, calibration operations correspond to determining values of terms in two simultaneous linear equations that may then be solved using known techniques. Continuing with this example, the equations associated with the master hardware delay are:

$$D_{m1}=c/2*((t_{endm1}-t_{startm1})-(2*t_{hw\_delay\_master}))$$

$$D_{m2}=c/2*((t_{endm2}-t_{startm2})-(3*t_{hw\_delay\_master}))$$

and, similarly, the equations associated with the slave hardware delay are:

$$D_{s1}=c/2*((t_{ends1}-t_{starts1})-(2*t_{hw\_delay\_slave}))$$

$$D_{s2}=c/2*((t_{ends2}-t_{starts2})-(3*t_{hw\_delay\_slave})).$$

The distances, $D_{x1}$ and $D_{x2}$, are assumed to be equal in each set of equations. The whole number multiples, 2 and 3, may be achieved by loopback between the transmitter 314 and the receiver 312 via switch 316. For example, calibration logic 332 may be configured to control switch 316 to achieve the loopback for the desired number of cycles.

Solving the simultaneous equations associated with the master hardware delay with $D_{m1}=D_{m2}$ yields:

$$t_{hw\_delay\_master}=(t_{endm2}-t_{startm2})-(t_{endm1}-t_{startm1})$$

and solving the simultaneous equations associated with the slave hardware delay and with $D_{s1}=D_{s2}$ yields:

$$t_{hw\_delay\_slave}=(t_{ends2}-t_{starts2})-(t_{endm1}-t_{starts1})$$

The calibration logic 332 of master device 301 and slave device 303 may each be further configured to query timer module 334 to determine the start times ($t_{startm2}$, $t_{startm1}$, $t_{starts2}$, $t_{start1}$) and the end times ($t_{endm2}$, $t_{endm1}$, $t_{ends2}$, $t_{ends1}$). The calibration operations may be performed once, may be repeated under different operating conditions (e.g., varying temperature, varying humidity) and/or may be performed over time. The master device 301 and the slave device 303 may each be configured to store the corresponding hardware propagation delay. In one nonlimiting example, the stored hardware propagation delay values may be stored in a lookup table (LUT).

Thus, the respective hardware propagation delays of the master device 301 and the slave device 303 may be determined via auto calibration techniques by each of the master device 301 and the slave device 303. The slave device 303 may be configured to communicate the slave hardware propagation delay ($t_{hw\_delay\_slave}$) information to the master device 301. The slave hardware propagation delay information may be communicated over normal communication channels. This communication may occur, for example, prior to ranging operations, during the normal mode, prior to changing to special mode and prior to sending the ACK, as described herein.

Figure 4:
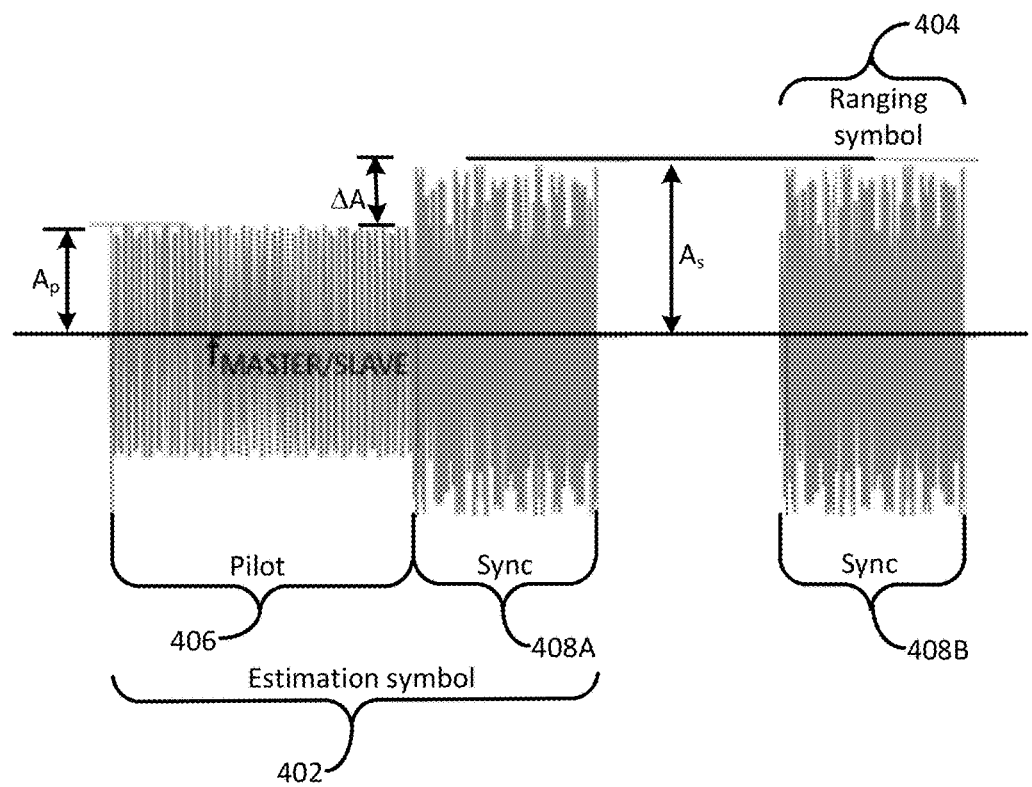
FIG. 4 illustrates an example estimation symbol and an example ranging symbol, according to an example.

FIG. 4 illustrates an example estimation symbol 402 and an example ranging symbol 404, according to an example. The estimation symbol 402 and the ranging symbol 404 have a frequency, $f_{master/slave}$. The estimation symbol 402 includes a pilot component 406 and a sync component 408A. The ranging symbol 404 has only a sync component 408B. The pilot component 406 has a pilot amplitude, Ap, and the sync components 408A, 408B have a sync amplitude As. The sync amplitude is greater than the pilot amplitude by an amount ΔA.

During normal mode operation, the master device 301 and the slave device 303 may be configured to communicate in compliance with a selected communication protocol (e.g., Zigbee, IEEE 802.11). The protocols generally include a range of allowable carrier frequencies and allowable signal amplitude, among other things. For example, for a Zigbee-compatible device, frequency$_{master/slave}$ may correspond to a frequency determined by a network coordinator. In another example, for an IEEE 802.11—compatible device, frequency$_{master/slave}$ may correspond to a channel allocated by an access point. The allowable ranges of values for pilot component amplitude and sync component amplitude may then be selected based, at least in part, on one or more of these protocols.

Turning again to FIG. 3, distance determination may include an estimation mode followed by a measurement mode. The estimation mode is configured to quantify general characteristics that may affect received signal strength. In other words, for a given amplitude of a transmitted symbol, the received signal strength may be relatively greater or relatively smaller depending on characteristics of the signal path between the master device and the slave device. The information provided by the estimation mode may then be utilized in the measurement mode, as described herein.

Initially, both master device 301 and slave device 303 may go to estimation mode. For example, master device 301 may initiate estimation mode by providing a special mode signal directly, or via a gateway, to slave device 303 to transition from normal mode to special mode. For example, ranging logic 330 of master device 301 may be configured to initiate the special mode signal. Prior to switching from normal mode to special mode, slave device 303 may be configured to provide calibration data (e.g., slave hardware propagation delay data) to the master device 301. Master device 301 may then utilize the received slave hardware propagation delay information, as described herein.

Special mode may then include estimation mode and measurement mode, as described herein. Slave device 303 may be configured to reply with an acknowledgment (ACK) to master device 301 in response to the special mode signal. For example, ranging logic of slave device 303 may be configured to provide the slave hardware propagation delay value and to provide the ACK. Slave device 303 may then be configured to wait in the special mode for a predetermined time interval and may then switch back to normal mode. In this manner, returning to normal mode may be implemented without an additional signal from master device 301.

After entering estimation mode, master device 301 is configured to monitor a current received signal strength and to wait until the current received signal strength, RSSI, is below a noise threshold, $RSSI_{noise}$. For example, ranging logic 330 may be configured to monitor RSSI module 318.

When the current received signal strength goes below the noise threshold, symbol generation module 306 may be configured to generate a master estimation symbol. The master estimation symbol corresponds to estimation symbol 402 of FIG. 4. Thus, the master estimation symbol includes a pilot component and a sync component, as described herein. The master estimation symbol may then be provided to transceiver 308, e.g., transmitter 314.

The master estimation symbol may then be transmitted from master device 301 by transmitter 314 via antenna 310. The master estimation symbol may be transmitted on a master frequency, $f_{master}$. Thus, the transmitted master estimation symbol is configured to include a master pilot component at frequency, $f_{master}$, and amplitude $A_p$ and a master sync component at frequency $f_{master}$ and amplitude $A_s$, i.e., simple amplitude modulation of a carrier wave of frequency $f_{master}$ with a fixed amplitude of Ap or As.

The master pilot component may be detected by, for example, symbol detection module 304 of slave device 303. Symbol detection module 304 includes a pilot detection module 320, a Vref generator 322 and a comparator 324. Pilot detection module 320 is configured to receive a baseband out (BB out) signal 313 from receiver 312 and RSSI 319 from RSSI module 318. BB out 313 is a voltage corresponding to a received input signal and RSSI 319 is an indication of the strength (i.e., energy) of the received input signal.

The received signal strength of the master pilot component of the estimation symbol is configured to provide an indication of channel characteristics (e.g., attenuation) between master device 301 and slave device 303. Pilot detection module 320 may then be configured to utilize the received signal strength of the master pilot component to set the reference voltage, Vref. For example, a predefined minimum RSSI threshold, related to the pilot symbol energy, may be set, e.g., by ranging logic 330, prior to estimation and ranging operations. Pilot detection module 320 is configured to monitor RSSI 319. If (when) RSSI 319 associated with a received signal crosses over the threshold, pilot detection module 320 is configured to capture BB out 313. The captured BB out value may then be provided to Vref generator 322. Vref generator 322 may then be configured to generate Vref based, at least in part, on the captured BB out value.

For example, the reference voltage may correspond to the received signal strength of the master pilot component. The reference voltage is configured to be greater than the received signal strength associated with ambient noise. The reference voltage may then be utilized by symbol detection module 304 to efficiently detect a sync component, e.g., a ranging symbol, as described herein.

Pilot detection module 320 and/or control module 302 may be configured to set Vref generator 322 to the determined reference voltage, Vref. Symbol detection module 304 may be configured to detect the master sync component of the master estimation symbol after setting Vref. For example, comparator 324 is configured to receive the reference voltage, Vref, on an inverting input and a received signal strength 319 from RSSI module 318 on a noninverting input. Comparator 324 may then provide an output to control module 302. If the RSSI 319 input is less than Vref, then the output may correspond to a logic zero (e.g., 0 volts (V)) and if the RSSI 319 is greater than Vref, then the output of comparator 324 may correspond to a logic one (e.g., 3 V). Thus, symbol detection module 304 may be configured to detect the master sync component of the master estimation symbol when the output of comparator 324 transitions from zero to one.

In response to detecting the master sync component of the master estimation symbol, control module 302, e.g., ranging logic 330, may be configured to reset Vref generator 322 and symbol generation module 306 of slave device 303 may be configured to generate the slave estimation symbol. The slave estimation symbol may include a slave pilot component and a slave sync component, as described herein.

The slave estimation symbol may then be transmitted from slave device 303 by transmitter 314 via antenna 310. The slave estimation symbol may be transmitted on a slave frequency, $f_{slave}$. Thus, the transmitted slave estimation symbol is configured to include a slave pilot component at frequency, $f_{slave}$, and amplitude $A_p$ and a slave sync component at frequency, $f_{slave}$ and amplitude $A_s$.

Symbol detection module 304 of master device 301 may then be configured to detect the slave pilot component. For example, master device 301 may include symbol detection module 304. Symbol detection module 304 of master device 301 operates similar to symbol detection module 304 described above with respect to slave device 303. The received signal strength of the slave pilot component of the slave estimation symbol is configured to provide, to master device 301, an indication of channel characteristics (e.g., attenuation) between master device 301 and slave device 303. Pilot detection module 320 may then be configured to utilize the received signal strength of the slave pilot component to set the reference voltage, Vref, as described herein. For example, the reference voltage may correspond to the received signal strength of the slave pilot component. The reference voltage is configured to be greater than the received signal strength associated with ambient noise. The reference voltage may then be utilized by symbol detection module 304 to efficiently detect a sync component, e.g., a ranging symbol, as described herein. In other words, the reference voltage may be configured to avoid a noise input triggering comparator 324 thus facilitating detecting only Sync symbols, as described herein.

Pilot detection module 320 and/or control module 302 may be configured to set Vref generator 322 to the determined reference voltage, Vref. Symbol detection module 304 may be configured to detect the slave sync component of the slave estimation symbol. Symbol detection module 304 may be configured to detect the slave sync component of the slave estimation symbol when the output of comparator 324 transitions from zero to one. Control module 302, e.g., ranging logic 330, of master device 301 may be configured to reset Vref generator 322.

Both devices, i.e., master device 301 and slave device 303, may then transition to measurement mode. Thus, both master device 301 and slave device 303 may be configured to set a respective reference voltage based, at least in part, on a received pilot component of an estimation symbol.

In measurement mode, ranging logic 330 of control module 302 of master device 301 may be configured to capture a start time from timer module 334 or to initiate timer module 334 and or counter module 336 to begin counting. The start time and/or initial count may then correspond to $t_{start}$, as described herein. Symbol generation module 306 of master device 301 may be configured to generate a master ranging symbol. The master ranging symbol corresponds to ranging symbol 404 of FIG. 4. Thus, the master ranging symbol includes a sync component, as described herein. The master ranging symbol may then be provided to transceiver 308 and transmitter 314. The master ranging symbol may then be transmitted from master device 301 by transmitter 314 via antenna 310. The master ranging symbol may be transmitted on a master frequency, $f_{master}$. Thus, the transmitted master ranging symbol is configured to include a master sync component at frequency, $f_{master}$, and amplitude $A_s$.

Symbol detection module 304 of slave device 303 may be configured to detect the master ranging symbol corresponding to the master sync symbol, as described herein. In response to detecting the master sync symbol, symbol generation module 306 of slave device 303 may be configured to generate the slave ranging symbol. The slave ranging symbol may correspond to a slave sync symbol, as described herein.

Transceiver 308 and switch 316 of slave device 303 may be configured to decouple antenna 310 from receiver 312 and couple antenna 310 to transmitter 314. Such switching operations of switch 316 may correspond to the receiver to transmitter switching delay, as described herein.

The slave ranging symbol, i.e., slave sync symbol, may then be transmitted from slave device 303 by transmitter 314 via antenna 310. The slave sync symbol may be transmitted on a slave frequency, $f_{slave}$. Thus, the transmitted slave ranging symbol is configured to correspond to a slave sync symbol at frequency, $f_{slave}$, and amplitude $A_s$. Symbol detection module 304 of master device 301 may be configured to detect the slave sync symbol. Symbol detection module 304 of master device 301 operates similar to symbol detection module 304 of slave device 303. Upon detection of the sync symbol, ranging logic 330 is configured to capture a current timer value from timer module 334 and/or a count from counter module 336. The captured timer value or count may then correspond to $t_{end}$, as described herein.

One ranging time interval includes generating and transmitting the master ranging symbol by master device 301, detecting the received master sync symbol corresponding to the transmitted master sync symbol, generating the slave ranging symbol, switching from receiver to transmitter and transmitting the slave ranging symbol by slave device 303 and detecting the received slave sync symbol corresponding to the transmitted slave sync symbol by master device 301. A duration of the ranging time interval may then correspond to the time interval $t_{end}-t_{start}$ included in the distance equation for D, as described herein. Master device 301 and slave device 303 may be configured to repeat measurement of the ranging time interval a number, n, times. For example, an appropriate value of n may be determined empirically. Ranging logic 330 of master device 301 may then be configured to stop timer 334.

A measurement start time, $t_{measurement\_start}$, may correspond to starting timer 334 and a measurement end time, i.e., measurement stop time, $t_{measurement\_end}$, may correspond to stopping timer 334. A total time duration 604 of a measurement interval may then correspond to a time difference between $t_{measurement\_end}$ and $t_{measurement\_start}$.

Ranging logic 330 may then be configured to determine a plurality of ranging time intervals over a measurement interval. For example, ranging logic 330 may be configured to generate a distribution of the plurality of ranging time interval durations captured during the measurement interval. Ranging logic 330 may then be configured to determine a most likely ranging time interval duration that may then correspond to a ranging cycle time. For example, relatively significantly less frequent ranging time interval durations may be discarded. The most likely ranging time interval duration may be determined utilizing a classification technique, e.g., k means clustering, kNN (k nearest neighbor), etc. The most likely ranging time interval duration may then correspond to the ranging cycle time that may then be substituted for time interval $t_{end}-t_{start}$ included in the distance equation for D, as described herein. The distance between the master and the slave may then be determined using the distance equation for D, the ranging cycle time (substituted for $t_{end}-t_{start}$) and the master hardware propagation delay and slave hardware propagation delay determined via calibration operations, as described herein.

Figure 5:
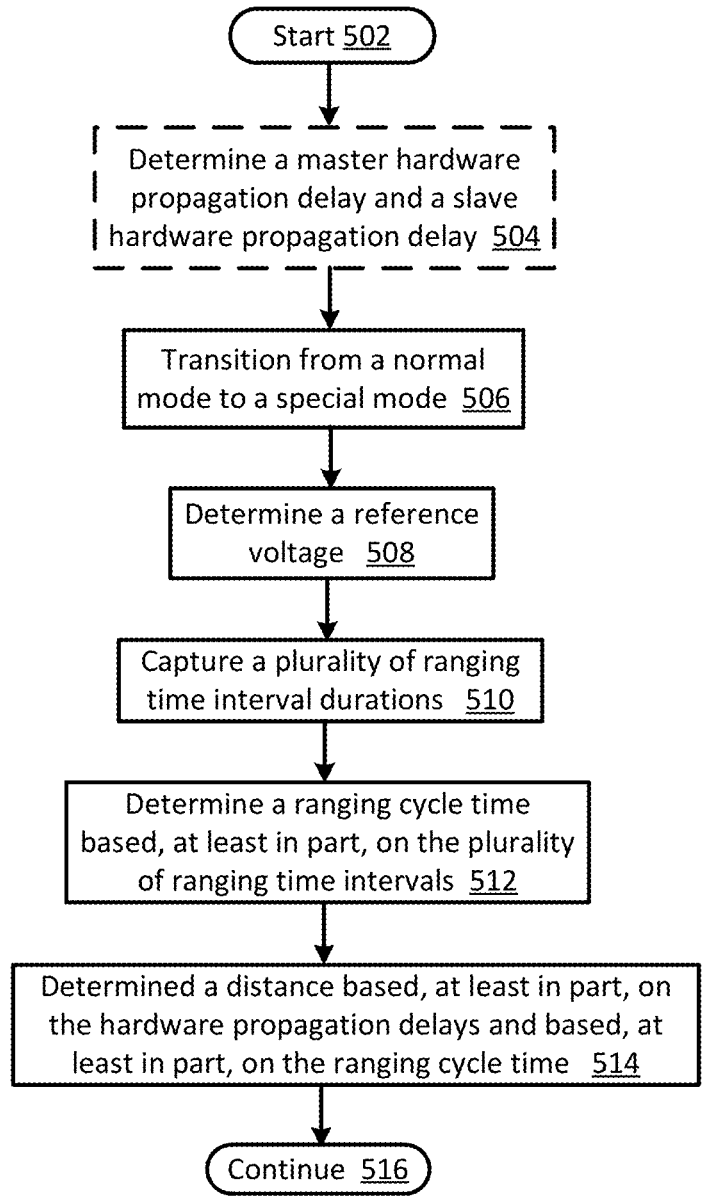
FIG. 5 is a flowchart illustrating distance determination operations, according to an example.

FIG. 5 is a flowchart 500 illustrating distance determination operations, according to an example. The operations of flowchart 500 may be performed by master device 301 and/or slave device 303. Operations of this embodiment may begin with start at operation 502. In some embodiments, a master hardware propagation delay and a slave hardware propagation delay may be determined at operation 504. A transition from a normal mode to a special mode may be performed at operation 506. A reference voltage may be determined at operation 508. A plurality of ranging time interval durations may be captured at operation 510. A ranging cycle time may be determined based, at least in part, on the plurality of ranging time intervals, at operation 512. A distance may be determined based, at least in part, on the hardware propagation delays and based, at least in part, on the ranging cycle time at operation 514. Program flow may then continue at operation 516.

Thus, a distance between a master and a slave may be determined.

Figure 6:
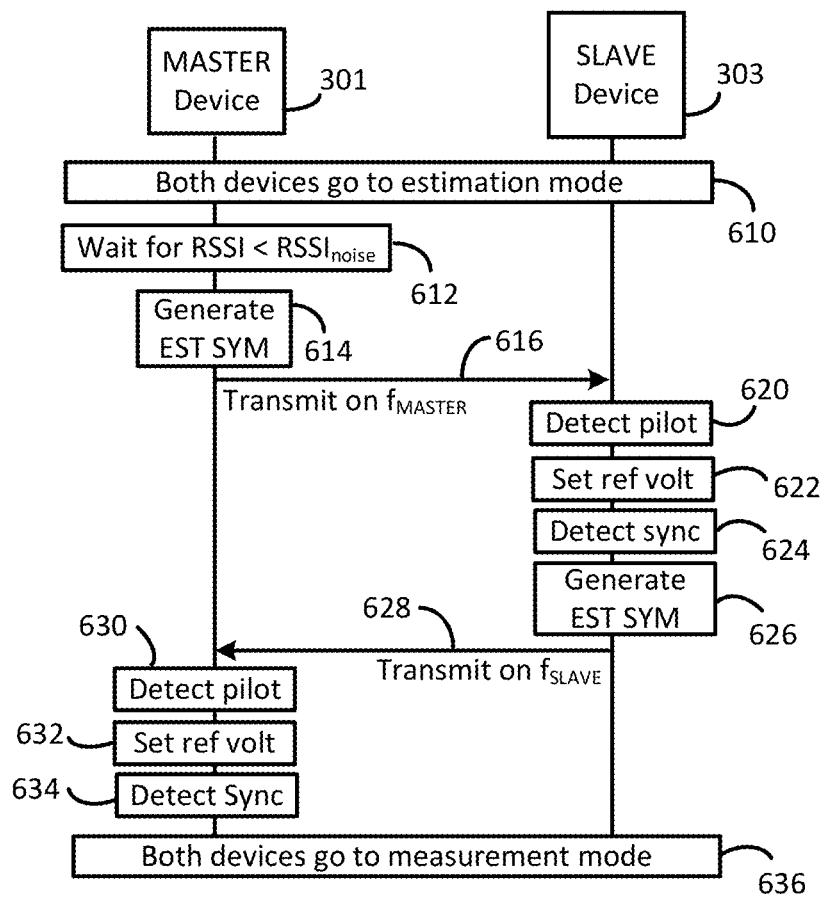
FIG. 6 is a flowchart illustrating estimation mode operations, according to an example.

FIG. 6 is a flowchart 600 illustrating estimation mode operations, according to an example. The operations of flowchart 600 may be performed by master device 301 and/or slave device 303.

Both devices may go to estimation mode at operation 610. The master device may wait for the received signal strength indicator to be less than an ambient received signal strength noise level ($RSSI_{noise}$) at operation 612. The master device may generate a master estimation symbol at operation 614. The master estimation symbol may then be transmitted on a master frequency $f_{master}$ at operation 616. The slave device may be configured to detect a master pilot symbol at operation 620. A slave reference voltage may then be set at operation 622. A master sync symbol may be detected by, e.g., slave device 303, at operation 624. A slave estimation symbol may be generated at operation 626. The slave estimation symbol may be transmitted on a slave frequency $f_{slave}$ at operation 628. A slave pilot symbol may be detected by, e.g., master device 301, at operation 630. A master reference voltage may then be set at operation 632. A slave sync symbol may be detected by, e.g., master device 301, at operation 634. Both devices may then go to normal mode at operation 636.

Thus, a master reference voltage and a slave reference voltage may be set based, at least in part, on a master estimation symbol and based, at least in part, on a slave estimation symbol.

Figure 7:
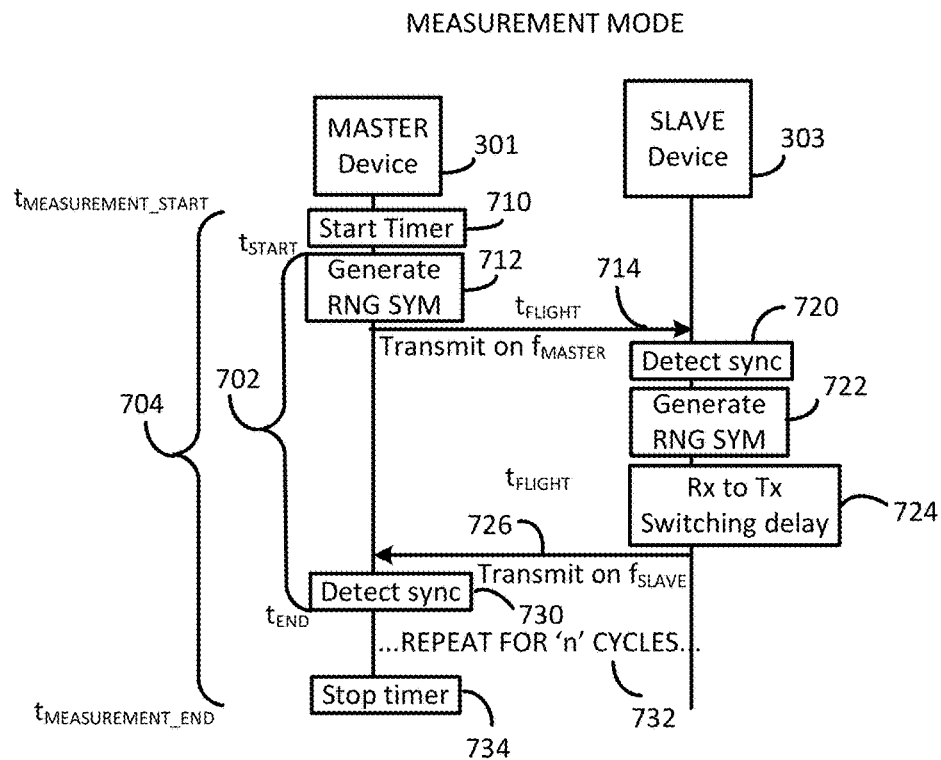
FIG. 7 is a flowchart illustrating measurement mode operations, according to an example.

FIG. 7 is a flowchart 700 illustrating measurement mode operations, according to an example. The operations of flowchart 700 may be performed by master device 301 and/or slave device 303.

A timer may be started at operation 710. For example, the timer may be included in control module 302 of master device 301. A master ranging symbol may be generated at operation 712. The master ranging symbol may be transmitted on frequency $f_{master}$ at operation 714. A master sync symbol may be detected at operation 720. For example, the master sync symbol may be detected by slave device 303. A time duration between transmission of the master ranging symbol and receipt by slave device 303 may correspond to a time of flight, $t_{flight}$.

A slave ranging symbol may be generated at operation 722. A transceiver, e.g., a slave device transceiver, may be switched from receive to transmit, resulting in a switching delay at operation 724. The slave ranging symbol may then be transmitted on frequency $f_{slave}$ at operation 726. A slave sync symbol may be detected at operation 730. For example, the slave sync symbol may be detected by master device 301.

Operations 712, 714, 720, 722, 724, 726 and 730 may be repeated a number, n, times at operation 732. The timer may be stopped at operation 734. A time interval duration associated with operations 712, 714, 720, 722, 724, 726 and 730 may correspond to one ranging time interval, 702 that begins at time $t_{start}$ and ends at time $t_{end}$. A measurement interval 704 begins with time $t_{measurement\_start}$ and ends with time $t_{measurement\_end}$. Time $t_{measurement\_start}$ corresponds to operation 710, start timer, and time $t_{measurement\_end}$ corresponds to operation 734, stop timer. Thus, the measurement interval 704 may include the number, n, ranging time intervals.

Thus, a plurality of ranging time interval durations may be determined.

In other examples, the operations and functionality described above with reference to FIGS. 3 to 7 may be embodied by a IoT device machine in the example form of an electronic processing system, within which a set or sequence of instructions may be executed to cause the electronic processing system to perform any one of the methodologies discussed herein, according to an example embodiment. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine. Further, while only a single machine may be depicted and referenced in the example above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor (e.g., a computer) to individually or jointly execute instructions to perform any one or more of the methodologies discussed herein.

Figure 8:
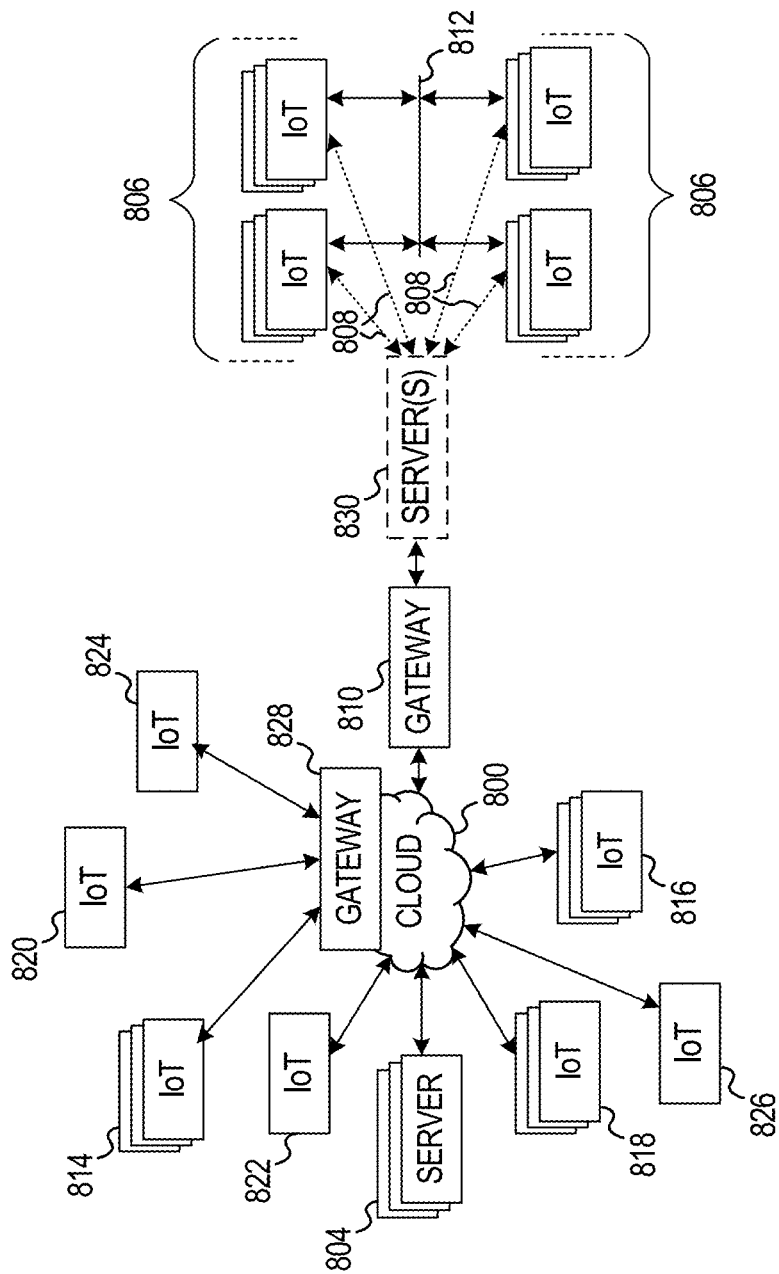
FIG. 8 illustrates a block diagram of a network illustrating communications among a number of IoT devices, according to an example.

FIG. 8 illustrates a drawing of a cloud computing network, or cloud 800, in communication with a number of Internet of Things (IoT) devices. The cloud 800 may represent the Internet, or may be a local area network (LAN), or a wide area network (WAN), such as a proprietary network for a company. The IoT devices may include any number of different types of devices, grouped in various combinations. For example, a traffic control group 806 may include IoT devices along streets in a city. These IoT devices may include stoplights, traffic flow monitors, cameras, weather sensors, and the like. The traffic control group 806, or other subgroups, may be in communication with the cloud 800 through wired or wireless links 808, such as LPWA links, optical links, and the like. Further, a wired or wireless sub-network 812 may allow the IoT devices to communicate with each other, such as through a local area network, a wireless local area network, and the like. The IoT devices may use another device, such as a gateway 910 or 928 to communicate with remote locations such as the cloud 900; the IoT devices may also use one or more servers 930 to facilitate communication with the cloud 900 or with the gateway 910. For example, the one or more servers 930 may operate as an intermediate network node to support a local edge cloud or fog implementation among a local area network. Further, the gateway 928 that is depicted may operate in a cloud-to-gateway-to-many edge devices configuration, such as with the various IoT devices 914, 920, 924 being constrained or dynamic to an assignment and use of resources in the cloud 900.

Other example groups of IoT devices may include remote weather stations 814, local information terminals 816, alarm systems 818, automated teller machines 820, alarm panels 822, or moving vehicles, such as emergency vehicles 824 or other vehicles 826, among many others. Each of these IoT devices may be in communication with other IoT devices, with servers 804, with another IoT fog device or system (not shown, but depicted in FIG. 2), or a combination therein. The groups of IoT devices may be deployed in various residential, commercial, and industrial settings (including in both private or public environments).

As can be seen from FIG. 8, a large number of IoT devices may be communicating through the cloud 800. This may allow different IoT devices to request or provide information to other devices autonomously. For example, a group of IoT devices (e.g., the traffic control group 806) may request a current weather forecast from a group of remote weather stations 814, which may provide the forecast without human intervention. Further, an emergency vehicle 824 may be alerted by an automated teller machine 820 that a burglary is in progress. As the emergency vehicle 824 proceeds towards the automated teller machine 820, it may access the traffic control group 806 to request clearance to the location, for example, by lights turning red to block cross traffic at an intersection in sufficient time for the emergency vehicle 824 to have unimpeded access to the intersection.

Clusters of IoT devices, such as the remote weather stations 814 or the traffic control group 806, may be equipped to communicate with other IoT devices as well as with the cloud 800. This may allow the IoT devices to form an ad-hoc network between the devices, allowing them to function as a single device, which may be termed a fog device or system (e.g., as described above with reference to FIG. 2).

FIG. 9 is a block diagram of an example of components that may be present in an IoT device 950 for implementing the techniques described herein. The IoT device 950 may include any combinations of the components shown in the example or referenced in the disclosure above. The components may be implemented as ICs, portions thereof, discrete electronic devices, or other modules, logic, hardware, software, firmware, or a combination thereof adapted in the IoT device 950, or as components otherwise incorporated within a chassis of a larger system. Additionally, the block diagram of FIG. 9 is intended to depict a high-level view of components of the IoT device 950. However, some of the components shown may be omitted, additional components may be present, and different arrangement of the components shown may occur in other implementations.

The IoT device 950 may include a processor 952, which may be a microprocessor, a multi-core processor, a multithreaded processor, an ultra-low voltage processor, an embedded processor, or other known processing element. The processor 952 may be a part of a system on a chip (SoC) in which the processor 952 and other components are formed into a single integrated circuit, or a single package, such as the Edison™ or Galileo™ SoC boards from Intel. As an example, the processor 952 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A10 processor from Apple® Inc., a Snapdragon™ processor from Qualcomm® Technologies, Inc., or an OMAP™ processor from Texas Instruments, Inc.

The processor 952 may communicate with a system memory 954 over an interconnect 956 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 958 may also couple to the processor 952 via the interconnect 956. In an example the storage 958 may be implemented via a solid state disk drive (SSDD). Other devices that may be used for the storage 958 include flash memory cards, such as SD cards, microSD cards, xD picture cards, and the like, and USB flash drives. In low power implementations, the storage 958 may be on-die memory or registers associated with the processor 952. However, in some examples, the storage 958 may be implemented using a micro hard disk drive (HDD). Further, any number of new technologies may be used for the storage 958 in addition to, or instead of, the technologies described, such resistance change memories, phase change memories, holographic memories, or chemical memories, among others.

The components may communicate over the interconnect 956. The interconnect 956 may include any number of technologies, including industry standard architecture (ISA), extended ISA (EISA), peripheral component interconnect (PCI), peripheral component interconnect extended (PCIx), PCI express (PCIe), or any number of other technologies. The interconnect 956 may be a proprietary bus, for example, used in a SoC based system. Other bus systems may be included, such as an I2C interface, an SPI interface, point to point interfaces, and a power bus, among others.

The interconnect 956 may couple the processor 952 to a mesh transceiver 962, for communications with other mesh devices 964. The mesh transceiver 962 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 964. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 962 may communicate using multiple standards or radios for communications at different range. For example, the IoT device 950 may communicate with close devices, e.g., within about 10 meters, using a local transceiver based on BLE, or another low power radio, to save power. More distant mesh devices 964, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 966 may be included to communicate with devices or services in the cloud 900 via local or wide area network protocols. The wireless network transceiver 966 may be a LPWA transceiver that follows the IEEE 802.15.4, or IEEE 802.15.4g standards, among others. The IoT device 950 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 962 and wireless network transceiver 966, as described herein. For example, the radio transceivers 962 and 966 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 962 and 966 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It can be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 966, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 968 may be included to provide a wired communication to the cloud 900 or to other devices, such as the mesh devices 964. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 968 may be included to allow connect to a second network, for example, a NIC 968 providing communications to the cloud over Ethernet, and a second NIC 968 providing communications to other devices over another type of network.

The interconnect 956 may couple the processor 952 to an external interface 970 that is used to connect external devices or subsystems. The external devices may include sensors 972, such as accelerometers, level sensors, flow sensors, optical light sensors, camera sensors, temperature sensors, a global positioning system (GPS) sensors, pressure sensors, barometric pressure sensors, and the like. The external interface 970 further may be used to connect the IoT device 950 to actuators 974, such as power switches, valve actuators, an audible sound generator, a visual warning device, and the like.

In some optional examples, various input/output (I/O) devices may be present within, or connected to, the IoT device 950. For example, a display or other output device 984 may be included to show information, such as sensor readings or actuator position. An input device 986, such as a touch screen or keypad may be included to accept input. An output device 984 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 950.

A battery 976 may power the IoT device 950, although in examples in which the IoT device 950 is mounted in a fixed location, it may have a power supply coupled to an electrical grid. The battery 976 may be a lithium ion battery, or a metal-air battery, such as a zinc-air battery, an aluminum-air battery, a lithium-air battery, and the like.

A battery monitor/charger 978 may be included in the IoT device 950 to track the state of charge (SoCh) of the battery 976. The battery monitor/charger 978 may be used to monitor other parameters of the battery 976 to provide failure predictions, such as the state of health (SoH) and the state of function (SoF) of the battery 976. The battery monitor/charger 978 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 978 may communicate the information on the battery 976 to the processor 952 over the interconnect 956. The battery monitor/charger 978 may also include an analog-to-digital (ADC) convertor that allows the processor 952 to directly monitor the voltage of the battery 976 or the current flow from the battery 976. The battery parameters may be used to determine actions that the IoT device 950 may perform, such as transmission frequency, mesh network operation, sensing frequency, and the like.

A power block 980, or other power supply coupled to a grid, may be coupled with the battery monitor/charger 978 to charge the battery 976. In some examples, the power block 980 may be replaced with a wireless power receiver to obtain the power wirelessly, for example, through a loop antenna in the IoT device 950. A wireless battery charging circuit, such as an LTC4020 chip from Linear Technologies of Milpitas, Calif., among others, may be included in the battery monitor/charger 978. The specific charging circuits chosen depend on the size of the battery 976, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 958 may include instructions 982 in the form of software, firmware, or hardware commands to implement the techniques described herein. Although such instructions 982 are shown as code blocks included in the memory 954 and the storage 958, it may be understood that any of the code blocks may be replaced with hardwired circuits, for example, built into an application specific integrated circuit (ASIC).

In an example, the instructions 982 provided via the memory 954, the storage 958, or the processor 952 may be embodied as a non-transitory, machine readable medium 960 including code to direct the processor 952 to perform electronic operations in the IoT device 950. The processor 952 may access the non-transitory, machine readable medium 960 over the interconnect 956. For instance, the non-transitory, machine readable medium 960 may be embodied by devices described for the storage 958 of FIG. 9 or may include specific storage units such as optical disks, flash drives, or any number of other hardware devices. The non-transitory, machine readable medium 960 may include instructions to direct the processor 952 to perform a specific sequence or flow of actions, for example, as described with respect to the flowchart(s) and block diagram(s) of operations and functionality depicted above.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Example 1

According to this example, there is provided a master device. The device includes a control module, a symbol generation module and a symbol detection module. The control module is to determine a distance between the master device and a slave device based, at least in part, on a received signal strength and based, at least in part, on a time interval that includes generation of a master ranging symbol and detection of a slave ranging symbol. The symbol generation module is to generate a transmit ranging symbol. The symbol detection module is to detect a received ranging symbol.

Example 2

This example includes the elements of example 1, wherein each ranging symbol corresponds to an amplitude modulated carrier.

Example 3

This example includes the elements of example 1, wherein the symbol detection module is to determine a reference voltage, Vref, based, at least in part, on a received signal strength associated with an estimation symbol.

Example 4

This example includes the elements according to any one of examples 1 to 3, wherein the distance is determined based, at least in part, on a measurement interval including a plurality of ranging time intervals.

Example 5

This example includes the elements of example 4, wherein the control module is to determine a ranging cycle time based, at least in part, on a distribution of the plurality of ranging time intervals.

Example 6

This example includes the elements according to any one of examples 1 to 3, wherein the distance is determined as:

$$D = c/2 * ((t_{end} - t_{start}) - (t_{hw\_delay\_slave} + t_{hw\_delay\_master}))$$

where c is the velocity of propagation of each ranging symbol in air, ($t_{end} - t_{start}$) corresponds to a ranging cycle time, $t_{hw\_delay\_slave}$ corresponds to a slave hardware propagation delay and $t_{hw\_delay\_master}$ corresponds to a master hardware propagation delay.

Example 7

This example includes the elements of example 3, wherein the estimation symbol includes a pilot component and a sync component, an amplitude of the sync component greater than an amplitude of the pilot component.

Example 8

This example includes the elements according to any one of examples 1 to 3, further including calibration logic to determine a hardware propagation delay.

Example 9

This example includes the elements according to any one of examples 1 to 3, wherein the time interval includes a master hardware propagation delay.

Example 10

This example includes the elements according to any one of examples 1 to 3, wherein the time interval includes a slave hardware propagation delay including a propagation delay associated with switching between transmit and receive in a transceiver.

Example 11

According to this example, there is provided a method. The method includes determining, by a control module, a distance between a master device and a slave device based, at least in part, on a received signal strength and based, at least in part, on a time interval. The time interval includes generation of a master ranging symbol and detection of a slave ranging symbol. The method further includes generating, by a symbol generation module, a transmit ranging symbol; and detecting, by a symbol detection module, a received ranging symbol.

Example 12

This example includes the elements of example 11, wherein each ranging symbol corresponds to an amplitude modulated carrier.

Example 13

This example includes the elements of example 11, further including determining, by the symbol detection module, a reference voltage, Vref, based, at least in part, on a received signal strength associated with an estimation symbol.

Example 14

This example includes the elements of example 11, wherein the distance is based, at least in part, on a measurement interval including a plurality of ranging time intervals.

Example 15

This example includes the elements of example 14, further including determining, by the control module, a ranging cycle time based, at least in part, on a distribution of the plurality of ranging time intervals.

Example 16

This example includes the elements of example 11, wherein the distance is determined as:

$$D = c/2 * ((t_{end} - t_{start}) - (t_{hw\_delay\_slave} + t_{hw\_delay\_master}))$$

where c is the velocity of propagation of each ranging symbol in air, $(t_{end} - t_{start})$ corresponds to a ranging cycle time, $t_{hw\_delay\_slave}$ corresponds to a slave hardware propagation delay and $t_{hw\_delay\_master}$ corresponds to a master hardware propagation delay.

Example 17

This example includes the elements of example 13, wherein the estimation symbol includes a pilot component and a sync component, an amplitude of the sync component greater than an amplitude of the pilot component.

Example 18

This example includes the elements of example 11, further including determining, by a calibration logic, a hardware propagation delay.

Example 19

This example includes the elements of example 11, wherein the time interval includes a master hardware propagation delay.

Example 20

This example includes the elements of example 11, wherein the time interval includes a slave hardware propagation delay including a propagation delay associated with switching between transmit and receive in a transceiver.

Example 21

According to this example, there is provided a system. The system includes a plurality of slave devices; and a master device. The master device includes a control module, a symbol generation module and the symbol detection module. The control module is to determine a distance between the master device and at least one slave device based, at least in part, on a received signal strength and based, at least in part, on a time interval including generation of a master ranging symbol and detection of a slave ranging symbol. The symbol generation module is to generate a transmit ranging symbol. The symbol detection module is to detect a received ranging symbol.

Example 22

This example includes the elements of example 21, wherein each ranging symbol corresponds to an amplitude modulated carrier.

Example 23

This example includes the elements of example 21, wherein the symbol detection module is to determine a reference voltage, Vref, based, at least in part, on a received signal strength associated with an estimation symbol.

Example 24

This example includes the elements according to any one of examples 21 to 23, wherein the distance is based, at least in part, on a measurement interval including a plurality of ranging time intervals.

Example 25

This example includes the elements of example 24, wherein the control module is to determine a ranging cycle time based, at least in part, on a distribution of the plurality of ranging time intervals.

Example 26

This example includes the elements according to any one of examples 21 to 23, wherein the distance is determined as:

$$D = c/2 * ((t_{end} - t_{start}) - (t_{hw\_delay\_slave} + t_{hw\_delay\_master}))$$

where c is the velocity of propagation of each ranging symbol in air, $(t_{end}-t_{start})$ corresponds to a ranging cycle time, $t_{hw\_delay\_slave}$ corresponds to a slave hardware propagation delay of a selected slave device and $t_{hw\_delay\_master}$ corresponds to a master hardware propagation delay.

Example 27

This example includes the elements of example 23, wherein the estimation symbol includes a pilot component and a sync component, an amplitude of the sync component greater than an amplitude of the pilot component.

Example 28

This example includes the elements according to any one of examples 21 to 23, wherein the master device includes calibration logic to determine a hardware propagation delay.

Example 29

This example includes the elements according to any one of examples 21 to 23, wherein the time interval includes a master hardware propagation delay.

Example 30

This example includes the elements according to any one of examples 21 to 23, wherein the time interval includes a slave hardware propagation delay including a propagation delay associated with switching between transmit and receive in a transceiver.

Example 31

According to this example, there is provided a computer readable storage device. The device has stored thereon instructions that when executed by one or more processors result in the following operations including determining a distance between a master device and a slave device based, at least in part, on a received signal strength and based, at least in part, on a time interval including generation of a master ranging symbol and detection of a slave ranging symbol; generating a transmit ranging symbol; and detecting a received ranging symbol.

Example 32

This example includes the elements of example 31, wherein each ranging symbol corresponds to an amplitude modulated carrier.

Example 33

This example includes the elements of example 31, wherein the instructions that when executed by one or more processors results in the following additional operations including determining a reference voltage, Vref, based, at least in part, on a received signal strength associated with an estimation symbol.

Example 34

This example includes the elements according to any one of examples 31 to 33, wherein the distance is based, at least in part, on a measurement interval including a plurality of ranging time intervals.

Example 35

This example includes the elements of example 34, wherein the instructions that when executed by one or more processors results in the following additional operations including determining a ranging cycle time based, at least in part, on a distribution of the plurality of ranging time intervals.

Example 36

This example includes the elements according to any one of examples 31 to 33, wherein the distance is determined as:

$$D=c/2*((t_{end}-t_{start})-(t_{hw\_delay\_slave}+t_{hw\_delay\_master}))$$

where c is the velocity of propagation of each ranging symbol in air, $(t_{end}-t_{start})$ corresponds to a ranging cycle time, $t_{hw\_delay\_slave}$ corresponds to a slave hardware propagation delay and $t_{hw\_delay\_master}$ corresponds to a master hardware propagation delay.

Example 37

This example includes the elements of example 33, wherein the estimation symbol includes a pilot component and a sync component, an amplitude of the sync component greater than an amplitude of the pilot component.

Example 38

This example includes the elements according to any one of examples 31 to 33, wherein the instructions that when executed by one or more processors results in the following additional operations including determining a hardware propagation delay.

Example 39

This example includes the elements according to any one of examples 31 to 33, wherein the time interval includes a master hardware propagation delay.

Example 40

This example includes the elements according to any one of examples 31 to 33, wherein the time interval includes a slave hardware propagation delay including a propagation delay associated with switching between transmit and receive in a transceiver.

Example 41

According to this example, there is provided a device. The device includes means for determining, by a control module, a distance between a master device and a slave device based, at least in part, on a received signal strength and based, at least in part, on a time interval including generation of a master ranging symbol and detection of a slave ranging symbol. The device further includes means for generating, by a symbol generation module, a transmit ranging symbol; and means for detecting, by a symbol detection module, a received ranging symbol.

Example 42

This example includes the elements of example 41, wherein each ranging symbol corresponds to an amplitude modulated carrier.

Example 43

This example includes the elements of example 41, further including means for determining, by the symbol detection module, a reference voltage, Vref, based, at least in part, on a received signal strength associated with an estimation symbol.

Example 44

This example includes the elements according to any one of examples 41 to 43, wherein the distance is based, at least in part, on a measurement interval including a plurality of ranging time intervals.

Example 45

This example includes the elements of example 44, further including means for determining, by the control module, a ranging cycle time based, at least in part, on a distribution of the plurality of ranging time intervals.

Example 46

This example includes the elements according to any one of examples 41 to 43, wherein the distance is determined as:

$$D=c/2*((t_{end}-t_{start})-(t_{hw\_delay\_slave}+t_{hw\_delay\_master}))$$

where c is the velocity of propagation of each ranging symbol in air, $(t_{end}-t_{start})$ corresponds to a ranging cycle time, $t_{hw\_delay\_slave}$ corresponds to a slave hardware propagation delay and $t_{hw\_delay\_master}$ corresponds to a master hardware propagation delay.

Example 47

This example includes the elements of example 43, wherein the estimation symbol includes a pilot component and a sync component, an amplitude of the sync component greater than an amplitude of the pilot component.

Example 48

This example includes the elements according to any one of examples 41 to 43, further including means for determining, by a calibration logic, a hardware propagation delay.

Example 49

This example includes the elements according to any one of examples 41 to 43, wherein the time interval includes a master hardware propagation delay.

Example 50

This example includes the elements according to any one of examples 41 to 43, wherein the time interval includes a slave hardware propagation delay including a propagation delay associated with switching between transmit and receive in a transceiver.

Example 51

According to this example, there is provided a system. The system includes at least one device arranged to perform the method of any one of examples 11 to 20.

Example 52

According to this example, there is provided a device. The device includes means to perform the method of any one of examples 11 to 20.

Example 53

According to this example, there is provided a computer readable storage device. The device has stored thereon instructions that when executed by one or more processors result in the following operations including: the method according to any one of examples 11 to 20.

In the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment.

What is claimed is:

1. A master device comprising:
control circuitry to determine a distance between the master device and a slave device based at least in part on a received signal strength and on a time interval comprising generation of a master ranging symbol and detection of a slave ranging symbol;
symbol generation circuitry to generate a transmit ranging symbol; and
symbol detection circuitry to detect a received ranging symbol and to determine a reference voltage based at least in part on a received signal strength associated with an estimation symbol.

2. The master device of claim 1, wherein each ranging symbol corresponds to an amplitude modulated carrier.

3. The master device of claim 1, wherein the distance is determined based at least in part on a measurement interval comprising a plurality of ranging time intervals.

4. The master device of claim 3, wherein the control circuitry is further to determine a ranging cycle time based at least in part on a distribution of the plurality of ranging time intervals.

5. The master device of claim 1, wherein the distance is determined as:

$$D=c/2*((t_{end}-t_{start})-(t_{hw\_delay\_slave}+t_{hw\_delay\_master}))$$

where c is a velocity of propagation of each ranging symbol in air, $(t_{end}-t_{start})$ corresponds to a ranging cycle time, $t_{hw\_delay\_slave}$ corresponds to a hardware propagation delay of the slave device and $t_{hw\_delay\_master}$ corresponds to a hardware propagation delay of the master device.

6. The master device of claim 1, wherein the estimation symbol comprises a pilot component and a sync component, and wherein an amplitude of the sync component is greater than an amplitude of the pilot component.

7. The master device of claim 1, further comprising calibration logic to determine a hardware propagation delay.

8. At least one non-transitory computer-readable storage device having stored thereon instructions which, when executed by at least one processor, result in operations comprising:
- determine a distance between a master device and a slave device based at least in part on a received signal strength and on a time interval comprising generation of a master ranging symbol and detection of a slave ranging symbol;
- determine a reference voltage based at least in part on a received signal strength associated with an estimation symbol;
- generate a transmit ranging symbol; and
- detect a received ranging symbol.

9. The at least one non-transitory computer-readable storage device of claim 8, wherein each ranging symbol corresponds to an amplitude modulated carrier.

10. The at least one non-transitory computer-readable storage device of claim 8, wherein the distance is based at least in part on a measurement interval comprising a plurality of ranging time intervals.

11. The at least one non-transitory computer-readable storage device of claim 10, wherein the stored instructions when executed by the least one processor result in additional operations comprising:
- determine a ranging cycle time based at least in part on a distribution of the plurality of ranging time intervals.

12. The at least one non-transitory computer-readable storage device of claim 8, wherein the distance is determined as:

$$D=c/2*((t_{end}-t_{start})-(t_{hw\_delay\_slave}+t_{hw\_delay\_master}))$$

where c is a velocity of propagation of each ranging symbol in air, $(t_{end}-t_{start})$ corresponds to a ranging cycle time, $t_{hw\_delay\_slave}$ corresponds to a hardware propagation delay of the slave device and $t_{hw\_delay\_master}$ corresponds to a hardware propagation delay of the master device.

13. The at least one non-transitory computer-readable storage device of claim 8, wherein the estimation symbol comprises a pilot component and a sync component, an amplitude of the sync component greater than an amplitude of the pilot component.

14. The at least one non-transitory computer-readable storage device of claim 8, wherein the stored instructions when executed by the least one processor result in additional operations comprising:
- determine a hardware propagation delay.

15. A master device, comprising:
- at least one processor; and
- at least one non-transitory computer-readable storage device having stored thereon instructions which when executed by at the least one processor result in operations comprising:
  - determine a distance between the master device and a slave device based at least in part on a received signal strength and on a time interval comprising generation of a master ranging symbol and detection of a slave ranging symbol;
  - determine a reference voltage based at least in part on a received signal strength associated with an estimation symbol;
  - generate a transmit ranging symbol; and
  - detect a received ranging symbol.

16. The master device of claim 15, wherein each ranging symbol corresponds to an amplitude modulated carrier.

17. The master device of claim 15, wherein the distance is based at least in part on a measurement interval comprising a plurality of ranging time intervals.

18. The master device of claim 17, wherein the instructions when executed by the least one processor result in additional operations comprising to determine a ranging cycle time based at least in part on a distribution of the plurality of ranging time intervals.

19. The master device of claim 15, wherein the distance is determined as:

$$D=c/2*((t_{end}-t_{start})-(t_{hw\_delay\_slave}+t_{hw\_delay\_master}))$$

where c is a velocity of propagation of each ranging symbol in air, $(t_{end}-t_{start})$ corresponds to a ranging cycle time, $t_{hw\_delay\_slave}$ corresponds a hardware propagation delay of the slave device and $t_{hw\_delay\_master}$ corresponds to a hardware propagation delay of the master device.

20. The master device of claim 15, wherein the estimation symbol comprises a pilot component and a sync component, and wherein an amplitude of the sync component is greater than an amplitude of the pilot component.

21. The master device of claim 15, further comprising calibration logic to determine a hardware propagation delay.

* * * * *